United States Patent
Garner et al.

(10) Patent No.: US 9,926,491 B2
(45) Date of Patent: Mar. 27, 2018

(54) AMMONIUM POLYPHOSPHATE BASED FIRE-RETARDANT COMPOSITIONS

(71) Applicant: X'aan Innovations Inc., Surrey (CA)

(72) Inventors: Andrew Garner, Vancouver (CA); Terrence Kennedy, Kamloops (CA); Mike Roberge, Surrey (CA)

(73) Assignee: X'aan Innovations Inc., Surrey (CA)

( * ) Notice: Subject to any disclaimer, the term of this patent is extended or adjusted under 35 U.S.C. 154(b) by 136 days.

(21) Appl. No.: 14/766,280

(22) PCT Filed: Feb. 6, 2014

(86) PCT No.: PCT/CA2014/050082
§ 371 (c)(1),
(2) Date: Aug. 6, 2015

(87) PCT Pub. No.: WO2014/121398
PCT Pub. Date: Aug. 14, 2014

(65) Prior Publication Data
US 2015/0368561 A1    Dec. 24, 2015

Related U.S. Application Data

(60) Provisional application No. 61/761,615, filed on Feb. 6, 2013.

(51) Int. Cl.
*C09K 21/04* (2006.01)
*C23F 11/08* (2006.01)

(52) U.S. Cl.
CPC .............. *C09K 21/04* (2013.01); *C23F 11/08* (2013.01)

(58) Field of Classification Search
None
See application file for complete search history.

(56) References Cited

U.S. PATENT DOCUMENTS 2,848,299 A    8/1958  Kahler et al.
3,088,819 A    5/1963  Funkhouser
(Continued)

OTHER PUBLICATIONS

WIPO, International Searching Authority, "International Search Report" dated Mar. 6, 2014 in International Patent Application No. PCT/CA2014/050082, 3 pages.
(Continued)

*Primary Examiner* — Joseph D Anthony
(74) *Attorney, Agent, or Firm* — Cameron IP

(57) ABSTRACT

An ammonium polyphosphate based fire-retardant composition comprises an ammonium polyphosphate, a suspending agent, and an effective amount of at least two corrosion inhibiting agents selected from the group of corrosion inhibiting agents including activated carbon, Epsom salts, Gypsum, azoles, and vapor phase inhibitors. The composition may further include a xanthan gum, a coloring agent or both.

TABLE 1

| Component | Formulation in Weight % |||||| 
|---|---|---|---|---|---|---|
| | Formulation 1 | Formulation 2 | Formulation 3 | Formulation 4 | Formulation 5 | Formulation 6 |
| Ammonium Polyphosphate | 91.80 | 91.80 | 91.75 | 90.80 | 91.80 | 91.75 |
| Attapulgite Clay | 1.50 | 1.50 | 1.50 | 1.50 | 1.50 | 1.50 |
| Iron Oxide | 1.20 | 1.20 | 1.20 | 1.20 | 1.20 | 1.20 |
| Xanthan Gum | 1.30 | 1.30 | 1.30 | 1.30 | 1.30 | 1.30 |
| Epsom Salt | 0.10 | 0.10 | 0.15 | 0.10 | 0.10 | 0.15 |
| 2-mercapto-benzothiazole | 0.10 | 0.10 | 0.10 | 0.10 | 0.10 | 0.10 |
| Benzotriazole | 1.00 | 2.50 | 2.50 | 2.00 | 2.00 | 2.00 |
| VpCl-609 ™ | 2.00 | 1.50 | 1.50 | 2.00 | — | — |

(Continued)

| Component | Formulation in Weight % |||||| 
|---|---|---|---|---|---|---|
| | Formulation 1 | Formulation 2 | Formulation 3 | Formulation 4 | Formulation 5 | Formulation 6 |
| Ammonium Polyphosphate | 91.80 | 91.80 | 91.75 | 90.80 | 91.80 | 91.75 |
| Attapulgite Clay | 1.50 | 1.50 | 1.50 | 1.50 | 1.50 | 1.50 |
| Iron Oxide | 1.20 | 1.20 | 1.20 | 1.20 | 1.20 | 1.20 |
| Xanthan Gum | 1.30 | 1.30 | 1.30 | 1.30 | 1.30 | 1.30 |
| Epsom Salt | 0.10 | 0.10 | 0.15 | 0.10 | 0.10 | 0.15 |
| 2-mercaptobenzothiazole | 0.10 | 0.10 | 0.10 | 0.10 | 0.10 | 0.10 |
| Benzotriazole | 1.00 | 2.50 | 2.50 | 2.00 | 2.00 | 2.00 |
| VpCl-609™ | 2.00 | 1.50 | 1.50 | 2.00 | - | - |
| Ammonium Benzoate | - | - | - | - | 2.00 | 2.00 |
| Ethanolamine | - | - | - | 1.00 | - | - |
| Activated Carbon | 1.00 | - | - | - | - | - |
| Total | 100.00 | 100.00 | 100.00 | 100.00 | 100.00 | 100.00 |

TABLE 1-continued

| | Formulation in Weight % | | | | | |
|---|---|---|---|---|---|---|
| Component | Formulation 1 | Formulation 2 | Formulation 3 | Formulation 4 | Formulation 5 | Formulation 6 |
| Ammonium Benzoate | — | — | — | — | 2.00 | 2.00 |
| Ethanolamine | — | — | — | 1.00 | — | — |
| Activated Carbon | 1.00 | — | — | — | — | — |
| Total | 100.00 | 100.00 | 100.00 | 100.00 | 100.00 | 100.00 |

15 Claims, 2 Drawing Sheets

(56) References Cited

U.S. PATENT DOCUMENTS

| | | | |
|---|---|---|---|
| 3,192,013 A | 6/1965 | Young | |
| 3,245,904 A | 4/1966 | Young | |
| 3,257,316 A | 6/1966 | Langguth et al. | |
| 3,309,324 A | 3/1967 | Langguth et al. | |
| 3,388,966 A | 6/1968 | MacDonald | |
| 3,542,686 A | 11/1970 | Miller | |
| 3,730,890 A | 5/1973 | Nelson | |
| 3,809,653 A | 5/1974 | Sansing et al. | |
| 3,861,897 A | 1/1975 | Frazier | |
| 3,960,735 A | 6/1976 | Lacey | |
| 4,011,301 A | 3/1977 | Young | |
| 4,053,561 A | 10/1977 | Irani | |
| 4,136,199 A | 1/1979 | Mills | |
| 4,500,502 A | 2/1985 | McDonald et al. | |
| 4,505,566 A | 3/1985 | Noguchi | |
| 4,522,651 A | 6/1985 | Seeney et al. | |
| 4,529,434 A * | 7/1985 | Ashmead | C05G 3/007 71/24 |
| 4,639,359 A | 1/1987 | Michalski et al. | |
| 4,692,323 A | 9/1987 | Bonel et al. | |
| 4,983,326 A | 1/1991 | Vandersall | |
| 5,958,117 A | 9/1999 | Crouch et al. | |
| 6,156,929 A * | 12/2000 | Chandler | C08K 5/0033 528/176 |
| 6,162,375 A | 12/2000 | Crouch et al. | |
| 6,238,621 B1 * | 5/2001 | Kalota | C10M 173/02 252/390 |
| 6,322,726 B1 | 11/2001 | Vandersall et al. | |
| 6,395,200 B2 | 5/2002 | Crouch et al. | |
| 6,420,470 B1 * | 7/2002 | Miksic | B32B 27/08 428/34.9 |
| 6,447,697 B1 | 9/2002 | Vandersall | |
| 6,620,348 B1 * | 9/2003 | Vandersall | C09K 21/04 252/2 |
| 6,780,991 B2 | 8/2004 | Vandersall et al. | |
| 6,802,994 B1 * | 10/2004 | Kegeler | A62D 1/0035 106/18.11 |
| 6,828,437 B2 | 12/2004 | Vandersall et al. | |
| 6,846,437 B2 | 1/2005 | Vandersall et al. | |
| 6,852,853 B2 | 2/2005 | Vandersall et al. | |
| 6,905,639 B2 * | 6/2005 | Vandersall | A62D 1/0035 106/14.12 |
| 7,736,549 B2 | 6/2010 | Griem | |
| 8,202,449 B2 | 6/2012 | Gamer et al. | |
| 2003/0030025 A1 * | 2/2003 | Bennett | A62C 99/0045 252/6 |
| 2007/0029531 A1 | 2/2007 | Ronan et al. | |
| 2008/0099735 A1 * | 5/2008 | Garner | C09K 21/04 252/601 |
| 2010/0200819 A1 | 8/2010 | Mans Fibla et al. | |
| 2012/0141754 A1 * | 6/2012 | Kubik | B32B 25/14 428/213 |
| 2014/0044593 A1 * | 2/2014 | Garner | C10M 145/40 422/16 |
| 2015/0008371 A1 * | 1/2015 | Garner | C23F 11/143 252/392 |
| 2015/0368561 A1 * | 12/2015 | Garner | C23F 11/08 252/602 |

OTHER PUBLICATIONS

WIPO, International Searching Authority, "Written Opinion of the International Searching Authority" dated Mar. 6, 2014 in International Patent Application No. PCT/CA2014/050082, 5 pages.

WIPO, International Searching Authority, "International Search Report" dated Feb. 14, 2008 in International Patent Application No. PCT/CA2007/001938, 4 pages.

WIPO, International Searching Authority, "Written Opinion of the International Searching Authority" dated Feb. 14, 2008 in International Patent Application No. PCT/CA2007/001938, 7 pages.

Chemical Abstracts (American Chemical Society) Nov. 28, 1977; vol. 87; Abstract No. 169219k.

* cited by examiner

| Component | Formulation in Weight % | | | | | |
|---|---|---|---|---|---|---|
| | Formulation 1 | Formulation 2 | Formulation 3 | Formulation 4 | Formulation 5 | Formulation 6 |
| Ammonium Polyphosphate | 91.80 | 91.80 | 91.75 | 90.80 | 91.80 | 91.75 |
| Attapulgite Clay | 1.50 | 1.50 | 1.50 | 1.50 | 1.50 | 1.50 |
| Iron Oxide | 1.20 | 1.20 | 1.20 | 1.20 | 1.20 | 1.20 |
| Xanthan Gum | 1.30 | 1.30 | 1.30 | 1.30 | 1.30 | 1.30 |
| Epsom Salt | 0.10 | 0.10 | 0.15 | 0.10 | 0.10 | 0.15 |
| 2-mercaptobenzothiazole | 0.10 | 0.10 | 0.10 | 0.10 | 0.10 | 0.10 |
| Benzotriazole | 1.00 | 2.50 | 2.50 | 2.00 | 2.00 | 2.00 |
| VpCI-609™ | 2.00 | 1.50 | 1.50 | 2.00 | - | - |
| Ammonium Benzoate | - | - | - | - | 2.00 | 2.00 |
| Ethanolamine | - | - | - | 1.00 | - | - |
| Activated Carbon | 1.00 | - | - | - | - | - |
| Total | 100.00 | 100.00 | 100.00 | 100.00 | 100.00 | 100.00 |

Fig. 1

| Formulation | Aluminum Corrosion Rate in mils per year (mpy) | | | | | | | |
|---|---|---|---|---|---|---|---|---|
| | Trial 1[1] | Trial 2[2] | Trial 3[3] | Trial 4[4] | Trial 5[5] | Trial 6[6] | Trial 7[7] | Trial 8[8] |
| Formulation 1 | 1.4 | 1.4 | 2.4 | 0.8 | 1.1 | 2.0 | 0.3 | 0.8 |
| Formulation 2 | 4.6 | 3.0 | 3.3 | 4.2 | 0.2 | 1.1 | 0.0 | 0.9 |
| Formulation 3 | 4.9 | 2.9 | 1.2 | 1.1 | 0.2 | 1.4 | 0.7 | 0.8 |
| Formulation 4 | 4.4 | 2.5 | 0.8 | 1.2 | 0.2 | 1.3 | 0.8 | 0.9 |
| Formulation 5 | 4.1 | 0.7 | 3.0 | 1.1 | 0.9 | 1.9 | 0.5 | 0.7 |
| Formulation 6 | 3.9 | 0.6 | 2.4 | 1.1 | 0.7 | 1.2 | 0.5 | 0.9 |

[1] Trial 1 – Aluminum coupon in concentrated formulation at 21º Celsius with total immersion
[2] Trial 2 – Aluminum coupon in concentrated formulation at 21º Celsius with partial immersion
[3] Trial 3 – Aluminum coupon in concentrated formulation at 49º Celsius with total immersion
[4] Trial 4 – Aluminum coupon in concentrated formulation at 49º Celsius with partial immersion
[5] Trial 5 – Aluminum coupon in diluted formulation at 21º Celsius with total immersion
[6] Trial 6 – Aluminum coupon in diluted formulation at 21º Celsius with partial immersion
[7] Trial 7 – Aluminum coupon in diluted formulation at 49º Celsius with total immersion
[8] Trial 8 – Aluminum coupon in diluted formulation at 49º Celsius with partial immersion

Fig. 2

AMMONIUM POLYPHOSPHATE BASED FIRE-RETARDANT COMPOSITIONS

CROSS-REFERENCE TO RELATED APPLICATION

This application claims the benefit of provisional application 61/761,615 filed in the United States Patent and Trademark Office on Feb. 6, 2013, the disclosure of which is incorporated herein by reference and priority to which is claimed.

BACKGROUND OF THE INVENTION

Field of the Invention

The present invention relates to fire-retardant compositions and, in particular, to improved ammonium polyphosphate based fire-retardant compositions.

Description of the Related Art

It is known to use ammonium polyphosphate based fire-retardant compositions to combat wildland fires. However, ammonium polyphosphate is corrosive and may damage equipment used to produce, store, handle and apply the fire-retardant composition. There is accordingly a need for corrosion inhibiting agents which reduce the corrosivity of ammonium polyphosphate based fire-retardant compositions. Ammonium polyphosphate based fire-retardant compositions may also include a thickening agent, a coloring agent and a suspending agent that carries the coloring agent.

U.S. Pat. No. 6,802,994 which issued on Sep. 12, 2004 to Kegeler et al., and the full disclosure of which is incorporated herein by reference, discloses corrosion inhibited fire-retardant compositions. The corrosion inhibited fire retardant compositions are comprised of an ammonium polyphosphate, a suspending agent, and a corrosion inhibiting system. The corrosion inhibiting system is comprised of at least one corrosion inhibiting agent selected from a group of corrosion inhibiting agents including azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate and any combination thereof. The corrosion inhibiting system is typically present in the fire retardant composition of the invention in a minor amount effective to substantially reduce corrosiveness of the concentrated fire retardant composition and of its diluted solution.

U.S. Pat. No. 6,905,639 which issued on Jun. 14, 2005 to Vandersall et al., and the full disclosure of which is incorporated herein by reference, discloses corrosion-inhibited fire-retardant compositions. The corrosion-inhibited fire-retardant compositions are comprised of an ammonium polyphosphate, at least one biopolymer having a particle size diameter of less than about 100 microns, and a corrosion inhibiting system. The corrosion inhibiting system is comprised of at least one corrosion inhibiting agent selected from a group of corrosion inhibiting agents including azoles, insoluble ferric pyrophosphate, soluble ferric pyrophosphate, ferrous oxalate, ferric citrate, ferrous sulfate, ferric ammonium citrate, soluble ferric orthophosphate, insoluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxide, ferric lactate, ferric resinate and any combination thereof. In a specific embodiment, the corrosion-inhibited fire retardant composition includes a xanthan biopolymer.

U.S. Pat. No. 8,202,449 which issued on Jun. 19, 2012 to Garner et al., and the full disclosure of which is incorporated herein by reference, discloses a fire-retardant composition comprising an ammonium polyphosphate, a suspending agent and a corrosion inhibiting agent. When in solution the corrosion inhibiting agent includes at least one ion selected from the group of ions consisting of aluminum ions, ferric ions, calcium ions and magnesium ions. Said ions complex an effective amount of fluoride ions present in the fire-retardant composition to reduce the corrosiveness of the fire-retardant composition.

SUMMARY OF THE INVENTION

It is an object of the present invention to provide an improved ammonium polyphosphate based fire-retardant composition.

There is accordingly provided an ammonium polyphosphate based fire-retardant composition comprising an ammonium polyphosphate, a suspending agent, and an effective amount of at least one corrosion inhibiting agent. The corrosion inhibiting agent may be selected from the group of corrosion inhibiting agents consisting of activated carbon, Epsom salts including $Mg^{2+}$, Gypsum including $Ca^{2+}$, azoles and vapour phase inhibitors. The fire-retardant composition may further include a xanthan gum, a coloring agent or any combination thereof. The fire-retardant composition may still further include a surfactant.

The azoles may be selected from the group of azoles including 2-mercaptobenzothiazole, dimercaptobenzothiazole and benzotriazole. The vapour phase inhibitors may be selected from the group of vapour phase inhibitors including ammonium carboxylate compounds and ethoxylated linear alcohols. The xanthan gum may have a weight average particle diameter greater than 100 microns. The suspending agent may be a sheared clay.

There is also provided an ammonium polyphosphate based fire-retardant composition comprising an ammonium polyphosphate, a suspending agent and a carbon compound which is a corrosion inhibiting agent. The carbon compound may be activated carbon.

The ammonium polyphosphate based fire-retardant composition disclosed herein provides the advantage of having reduced corrosivity.

BRIEF DESCRIPTIONS OF TABLES

The invention will be more readily understood from the following description of the embodiments thereof given, by way of example only, with reference to the accompanying tables, in which:

Table 1 shows formulations of fire-retardant compositions; and

Table 2 shows yearly corrosion rates (in mils-per-year) for the formulations of Table 1.

DESCRIPTIONS OF THE PREFERRED EMBODIMENTS

Disclosed are novel and improved fire-retardant compositions comprising an ammonium polyphosphate; a suspending agent which may be in the form of a sheared clay such as attapulgite clay or hydrous magnesium aluminum silicate such as MINI-U-GEL® FG or MINI-U-GEL® 400 from Active Minerals International, LLC of 1130 Dade Street, Quincy, Fla. 32351; an iron oxide coloring agent in the form of Bayferrox® Red 101 from Lanxess Deutschland GmbH of D-51369 Leverkusen, Federal Republic of Germany; and a xanthan gum which may have a weight average particle size diameter greater than 100 micrometers.

The fire-retardant composition further includes corrosion inhibiting agents selected from the group of corrosion inhibiting agents consisting of a magnesium containing compound such as $MgSO_4.7H_2O$ (Epsom salt), with or without a calcium containing compound such as $CaSO_4.2H_2O$ (Gypsum) or $Ca(OH)_2$ (Lime), an azole such as 2-mercaptobenzothiazole, dimercaptobenzothiazole, benzotriazole, or proprietary azoles such as COBRATEC® 928 or COBRATEC® 939 from PMT Specialties Group, Inc. of 501 Murray Road, Cincinnati, Ohio 45217, and a proprietary vapour phase inhibitor such as VpCI-309SF™, vpCI609™ (an ammonium carboxylate compound) or VpCI415™ (an ethoxylated linear alcohol) from Cortec Corporation, 4119 White Bear Parkway, St. Paul, Minn. 55110.

The corrosion inhibiting agent may alternatively be a carbon compound, for example, activated carbon or graphite. The carbon compound may bond with fluoride ions in the fire-retardant composition. This may prevent the fluoride ions from reacting with aluminum, steel, and brass equipment used to produce, store, handle and apply the fire retardant composition, and thereby reduce the corrosivity of the fire-retardant composition. The corrosion inhibiting agent may still alternatively be an ion exchange agent, for example, a zeolite which absorbs fluoride ions in the fire-retardant composition. This may likewise prevent the fluoride ions from reacting with aluminum, steel, and brass equipment used to produce, store, handle and apply the fire retardant composition and thereby reduce the corrosivity of the fire-retardant composition.

Effective composition ranges for the xanthan gum are less than or equal to 7%. Effective composition ranges for corrosion inhibiting agents are under 2% for Epsom salts ($MgSO_4.7H2O$), below 1% for Gypsum ($CaSO_4.2H_2O$), less than or equal to 5% for the azoles, and less than or equal to 2% for VpCI-609™ and VpCI-309SF™. Effective composition ranges for the clay as well as MINI-U-GEL® 400 and MINI-U-GEL® FG are less than 4%. Examples of formulations of the fire-retardant composition are shown below.

Formulation 1 of the fire-retardant composition comprises by weight 91.80% ammonium polyphosphate, 1.50% attapulgite clay, 1.20% iron oxide, 1.30% xanthan gum, 0.10% Epsom salt, 0.10% 2-mercaptobenzothiazole, 1.00% benzotriazole, 2.00% VpCI609™ and 1.00% activated carbon.

Formulation 2 of the fire-retardant composition comprises by weight 91.80% ammonium polyphosphate, 1.50% attapulgite clay, 1.20% iron oxide, 1.30% xanthan gum, 0.10% Epsom salt, 0.10% 2-mercaptobenzothiazole, 2.50% benzotriazole and 1.50% VpCI-609™.

Formulation 3 of the fire-retardant composition comprises by weight 91.75% ammonium polyphosphate, 1.50% attapulgite clay, 1.20% iron oxide, 1.30% xanthan gum, 0.15% Epsom salt, 0.10% 2-mercaptobenzothiazole, 2.50% benzotriazole and 1.50% VpCI-609™.

Formulation 4 of the fire-retardant composition comprises by weight 90.80% ammonium polyphosphate, 1.50% attapulgite clay, 1.20% iron oxide, 1.30% xanthan gum, 0.10% Epsom salt, 0.10% 2-mercaptobenzothiazole, 2.00% benzotriazole, 2.00% VpCI609™ and 1.00% ethanolamine.

Formulation 5 of the fire-retardant composition comprises by weight 91.80% ammonium polyphosphate, 1.50% attapulgite clay, 1.20% iron oxide, 1.30% xanthan gum, 0.10% Epsom salt, 0.10% 2-mercaptobenzothiazole, 2.00% benzotriazole and 2.00% ammonium benzoate.

Formulation 6 of the fire-retardant composition comprises by weight 91.75% ammonium polyphosphate, 1.50% attapulgite clay, 1.20% iron oxide, 1.30% xanthan gum, 0.15% Epsom salt, 0.10% 2-mercaptobenzothiazole, 2.00% benzotriazole and 2.00% ammonium benzoate.

The fire-retardant compositions are formulated to pass the USDA Forest Service Specification 5100-304c as a Wet Concentrate and as a mixed (diluted) fire-retardant composition, with appropriate Health and Safety Performance, Combustion-Retarding Effectiveness, Physical Properties, and Materials Effects. Tables 1 and 2 show the formulations and corrosivity of the fire-retardant compositions disclosed herein.

It will be understood by a person skilled in the art that many of the details provided above are by way of example only, and are not intended to limit the scope of the invention which is to be determined with reference to the following claims.

What is claimed is:

1. An ammonium polyphosphate based fire-retardant composition comprising:
   an ammonium polyphosphate;
   a suspending agent; and
   at least two corrosion inhibiting agents, wherein the corrosion inhibiting agents are ammonium benzoate and at least one corrosion inhibiting agent selected from the group of corrosion inhibiting agents including activated carbon, Epsom salts, Gypsum, azoles, and vapour phase inhibitors.

2. The ammonium polyphosphate based fire-retardant composition as claimed in claim 1 including both Epsom salts and vapour phase inhibitors.

3. The ammonium polyphosphate based fire-retardant composition as claimed in claim 1 wherein the azoles are selected from the group of azoles including 2-mercaptobenzothiazole, dimercaptobenzothiazole and benzotriazole.

4. The ammonium polyphosphate based fire-retardant composition as claimed in claim 1 wherein the vapour phase inhibitors are selected from the group of vapour phase inhibitors including ammonium carboxylate compounds and ethoxylated linear alcohols.

5. The ammonium polyphosphate based fire-retardant composition as claimed in claim 1 further including a xanthan gum having a weight average particle diameter greater than 100 microns.

6. The ammonium polyphosphate based fire-retardant composition as claimed in claim 1 wherein the suspending agent is a sheared clay.

7. The ammonium polyphosphate based fire-retardant composition as claimed in claim 1 further including a coloring agent.

8. The ammonium polyphosphate based fire-retardant composition as claimed in claim 1 further including a surfactant.

9. An ammonium polyphosphate based fire-retardant composition comprising: an ammonium polyphosphate;
   a sheared clay;
   a coloring agent; and
   at least two corrosion inhibiting agents, wherein the corrosion inhibiting agents are ammonium benzoate and at least one corrosion inhibiting agent selected from the group of corrosion inhibiting agents including activated carbon, Epsom salts, 2-mercaptobenzothiazole, dimercaptobenzothiazole, benzotriazole, ammonium carboxylate compounds, and ethoxylated linear alcohols.

10. The ammonium polyphosphate based fire-retardant composition as claimed in claim 9 further including a xanthan gum having a weight average particle diameter greater than 100 microns.

11. An ammonium polyphosphate based fire-retardant composition comprising: an ammonium polyphosphate; a suspending agent; and at least three corrosion inhibiting agents wherein the corrosion inhibiting agents are benzotriazole, ammonium benzoate and at least one corrosion inhibiting agent selected from the group of corrosion inhibiting agents including activated carbon, Epsom salts, Gypsum, azoles, and vapour phase inhibitors.

12. The ammonium polyphosphate based fire-retardant composition as claimed in claim 11 further including a xanthan gum having a weight average particle diameter greater than 100 microns.

13. The ammonium polyphosphate based fire-retardant composition as claimed in claim 1 wherein the ammonium polyphosphate based fire-retardant composition is about 2% by weight ammonium benzoate.

14. The ammonium polyphosphate based fire-retardant composition as claimed in claim 9 wherein the ammonium polyphosphate based fire-retardant composition is about 2% by weight ammonium benzoate.

15. The ammonium polyphosphate based fire-retardant composition as claimed in claim 11 wherein the ammonium polyphosphate based fire-retardant composition is about 2% by weight ammonium benzoate.

* * * * *